Patented June 7, 1927.

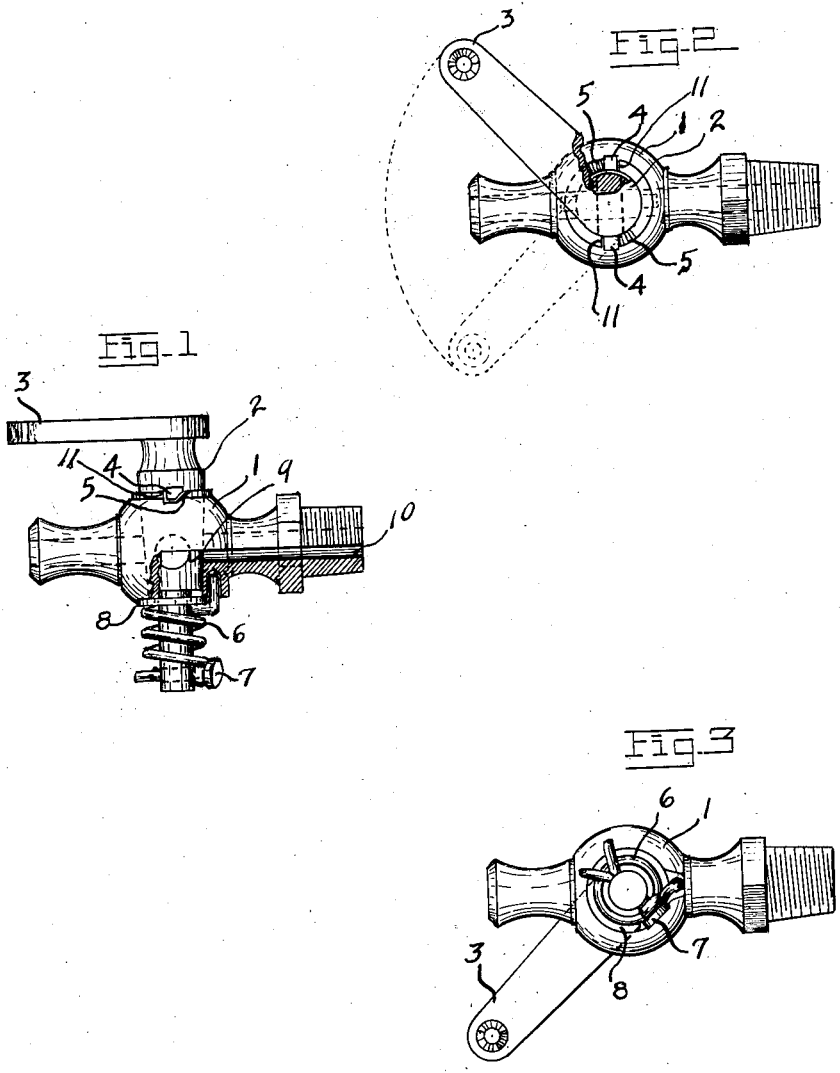

1,631,166

UNITED STATES PATENT OFFICE.

EARL V. SPRAGUE, OF DAVENPORT, IOWA, ASSIGNOR OF ONE-THIRD TO EVERETT C. WILSON AND ONE-THIRD TO HARRY J. HILSON, BOTH OF DAVENPORT, IOWA.

SELF-CLOSING STOPCOCK.

Application filed March 14, 1923. Serial No. 625,132.

My invention has reference to self-closing stop-cocks, of that class which are provided with a tapered valve of cylindrical form, and a seat therefor of corresponding shape. It is specially designed for use with the magneto casing of a motor vehicle, but is equally effective for use in air pipe valves, pet cocks, water bibs, or other valves of that kind.

Stop-cocks of this kind always have a considerable amount of engaging surface, so that frequently the valve will stick in its seat, especially if the parts are corroded. Some of said devices are provided with a spring control, tending to hold the valve in its seat, but these add to the frictional action, and render the operation of the valve still more difficult. As a result, the valve is frequently not fully opened when it is desired that it should be, or is left open a little when it is intended that it should be closed. In the case of stop-cocks located beneath the body of an automobile, the operation thereof is difficult at best, and if the valve does not work freely it adds to the difficulty.

The chief purpose of the present invention is to provide a means whereby the initial action thereof will serve to loosen the valve, and lift it a little in its seat, insuring a perfect freedom in the continued operation thereof. This is accomplished automatically, and without any effort on the part of the operator, other than that usually required in working the valve. This operation accompanies the usual movement of the valve, the initial movement referred to being a turning of the valve on its axis, accompanied by a slight lengthwise movement thereof, followed by a continued rotation to fully open the valve.

Another feature of the invention consists in a yieldable control for the valve, possessing a double function, the first of which serves to automatically reverse the rotation of the valve, and the second of which operates to re-seat the valve at the end of its rotary movement.

The invention is of simple formation, and can be produced at a minimum of expense. The particular construction, arrangement, and operation of the parts thereof will be more fully understood from the following specification, taken in connection with the accompanying drawings, in which:

Fig. 1 is a side elevation, partly in section, showing the invention in its entirety.

Fig. 2 is a plan view, partly in section.

Fig. 3 is a lower end view thereof.

The reference number 1 indicates the body of a stop-cock of usual type, which is provided with a cross-bore of a tapered cylindrical form, in which is rotatable a similarly shaped plug or valve 2, provided at one of its ends with a handle 3, by means of which the valve may be rotated. At its outer end the handle 3 is provided with an opening, for the attachment of a wire or other connection by means of which the valve may be actuated when in an out-of-the-way place.

Projecting from opposite sides of the valve 2 are lugs 4, normally positioned in recesses in the end of the body 1. Said recesses are located between sections 5, the faces of which are in a plane at right angles with the axis of the valve 2, and upon which faces said lugs slide without resistance. At the opposite end of the valve from the handle 3 the valve is provided with an extension of reduced diameter, upon which is supported a coiled spring 6, one end of which is secured to the body 1 and the other end connected to a pin 7, seated in the end of said extension. The valve 2 is provided further with an opening 9, adapted to communicate with a channel 10 in the body of the valve, but held normally at an angle therewith. By turning the handle 3 in an anti-clockwise direction, as shown in broken lines in Fig. 2, the opening and channel are brought into alignment in the usual manner. A washer 8 is interposed between the spring 6 and end of the body 1, to prevent the spring from being caught in the end of said body portion.

The lugs 4 are provided on their lower sides with beveled faces, which are in contact with opposite disposed faces or planes in the recesses in which the lugs are positioned, and a slight rotary movement of the valve, in the direction indicated, operates to lift the valve a little distance with relation to its seat, so that the same can be turned with perfect freedom. As the valve is rotated, the tension of the spring 6 is increased, power being thus stored in said spring to cause a return movement of the valve as soon as the force which is applied to the handle 3 is removed. After the lugs 4 leave the retaining recesses, the edges 5 form perfectly smooth tracks therefor, upon which the lugs move freely in either direction, and, upon the release of the handle 3 the return movement of the valve to its normal position is automatic.

The spring 6 also exerts an expanding force, longitudinally of the valve, tending to automatically return the lugs 4 to their recesses. While the device is shown and set forth herein as being fitted with two of the lugs 4, it can be operated with one thereof. By the use of two of said lugs a balanced effect is produced, however, causing the valve to work more freely.

The invention is not limited to the exact embodiment set out herein, as changes can be and have been made in the construction and arrangement of the various parts, which will readily suggest themselves to one skilled in the art, and which will still be within the scope and purposes of the invention.

What I claim, and desire to secure by Letters Patent, is:

1. In a self-closing valve, closely fitting body and plug members, cooperating means on said members for unseating the plug at the beginning of its rotary movement, and a stop to limit the closing movement of the plug.

2. In a self-closing valve, a body member having a tapered bore, a correspondingly tapered plug fitting and rotatable in said bore, projections on the plug, corresponding projections on the body member cooperating with the first named projections to limit the closing movement of the plug, and a track formed by the body projections further cooperating with the plug projections to withdraw the plug from seating engagement with the body at the beginning of its rotative movement and hold it out of engagement until it returns to closed position.

3. A device of the class described, comprising a body member having a tapered bore and a valve-member of corresponding shape rotatable therein, said body and valve members having interacting elements capable of automatically unseating the valve member upon an initial rotary movement thereof, by causing a limited movement thereof lengthwise of its seat; and a tension device, adapted to return said valve to its original rotative position after being rotated, and also capable of causing a reseating of said valve-member, after the same has been unseated.

In testimony, that I claim the invention set forth above I have hereunto set my hand this 17th day of February, 1923.

EARL V. SPRAGUE.